(12) United States Patent
Kidachi

(10) Patent No.: US 9,439,366 B2
(45) Date of Patent: Sep. 13, 2016

(54) DRIPPER FOR DRIP IRRIGATION, AND DRIP-IRRIGATION DEVICE PROVIDED WITH SAME

(71) Applicant: Enplas Corporation, Saitama (JP)

(72) Inventor: Masahiro Kidachi, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 14/652,369

(22) PCT Filed: Dec. 17, 2013

(86) PCT No.: PCT/JP2013/007397
§ 371 (c)(1),
(2) Date: Jun. 15, 2015

(87) PCT Pub. No.: WO2014/097612
PCT Pub. Date: Jun. 26, 2014

(65) Prior Publication Data
US 2015/0319940 A1 Nov. 12, 2015

(30) Foreign Application Priority Data

Dec. 17, 2012 (JP) .................................. 2012-274556
Dec. 20, 2012 (JP) .................................. 2012-278354

(51) Int. Cl.
*A01G 25/02* (2006.01)
(52) U.S. Cl.
CPC .................................. *A01G 25/023* (2013.01)
(58) Field of Classification Search
CPC ........ A01G 25/023; B05B 1/02; B05B 1/14; B05B 1/3006; B05B 15/00; B05B 15/069
USPC .................................. 239/542, 547, 570, 571
See application file for complete search history.

(56) References Cited

U.S. PATENT DOCUMENTS 3,780,946 A 12/1973 Smith et al.
4,161,291 A * 7/1979 Bentley ................ A01G 25/023
239/542

(Continued)

FOREIGN PATENT DOCUMENTS

EP 2893801 A1 7/2015
GB 2018113 A 10/1979

(Continued)

OTHER PUBLICATIONS

International Search Report from International Application No. PCT/JP2013/007397.

(Continued)

*Primary Examiner* — Arthur O Hall
*Assistant Examiner* — Viet Le
(74) *Attorney, Agent, or Firm* — Brundidge & Stanger, P.C.

(57) ABSTRACT

A dripper for drip irrigation according to the present invention comprises a first member and a second member that are formed integrally from a resin material, and includes an inter-member flow passage formed between the members. The first member is provided with a first plate and a pipe that guides an irrigation liquid, which flows in from an inflow part, to the inter-member flow passage. The second member is provided with a second plate and a discharge port. The first member is further provided with a flow regulation valve that regulates the flow of the irrigation liquid, and the second member is provided with a flow-volume control valve that controls the flow volume of the irrigation liquid.

20 Claims, 21 Drawing Sheets

(56) References Cited

U.S. PATENT DOCUMENTS

| | | | | |
|---|---|---|---|---|
| 5,294,058 A * | 3/1994 | Einav | ............ | F15C 3/04 |
| | | | | 138/45 |
| 5,413,282 A * | 5/1995 | Boswell | ............ | B05B 1/3006 |
| | | | | 239/542 |
| 5,443,212 A | 8/1995 | Dinur | | |
| 5,711,482 A * | 1/1998 | Yu | ............ | A01G 25/023 |
| | | | | 239/11 |
| 5,813,603 A * | 9/1998 | Kurtz | ............ | A01G 25/023 |
| | | | | 239/1 |
| 5,820,028 A * | 10/1998 | Dinur | ............ | B05B 1/083 |
| | | | | 239/542 |
| 5,820,029 A * | 10/1998 | Marans | ............ | A01G 25/023 |
| | | | | 239/542 |
| 8,091,800 B2 * | 1/2012 | Retter | ............ | A01G 25/023 |
| | | | | 239/271 |
| 2002/0047053 A1 * | 4/2002 | Bron | ............ | G05D 16/0647 |
| | | | | 239/542 |
| 2005/0279866 A1 * | 12/2005 | Belford | ............ | A01G 25/026 |
| | | | | 239/542 |
| 2005/0284966 A1 * | 12/2005 | DeFrank | ............ | A01G 25/023 |
| | | | | 239/542 |
| 2009/0020634 A1 * | 1/2009 | Schweitzer | ............ | A01G 25/023 |
| | | | | 239/542 |
| 2010/0237170 A1 * | 9/2010 | Rosenberg | ............ | A01G 25/023 |
| | | | | 239/106 |
| 2013/0341431 A1 * | 12/2013 | Ensworth | ............ | A01G 25/023 |
| | | | | 239/542 |
| 2014/0263758 A1 * | 9/2014 | Turk | ............ | A01G 25/023 |
| | | | | 239/542 |
| 2014/0374502 A1 * | 12/2014 | Nourian | ............ | A01G 25/023 |
| | | | | 239/11 |
| 2015/0223414 A1 * | 8/2015 | Kidachi | ............ | A01G 25/023 |
| | | | | 239/542 |
| 2015/0250111 A1 * | 9/2015 | Kidachi | ............ | A01G 25/023 |
| | | | | 239/542 |
| 2015/0319940 A1 * | 11/2015 | Kidachi | ............ | A01G 25/023 |
| | | | | 239/542 |
| 2016/0095285 A1 * | 4/2016 | Loebinger | ............ | A01G 25/023 |
| | | | | 239/542 |

FOREIGN PATENT DOCUMENTS

| | | |
|---|---|---|
| JP | 2008-503232 A | 2/2008 |
| WO | 2011/051933 A1 | 5/2011 |

OTHER PUBLICATIONS

Extended European Search Report for EP 13866188.9 dated Jul. 4, 2016.

* cited by examiner

DRIPPER FOR DRIP IRRIGATION, AND DRIP-IRRIGATION DEVICE PROVIDED WITH SAME

TECHNICAL FIELD

The present invention relates to a drip irrigation dripper and a drip irrigation device including the drip irrigation dripper, and particularly to a drip irrigation dripper and a drip irrigation device including the drip irrigation dripper, which are suitable for growing plants.

BACKGROUND ART

Conventionally, drip irrigation devices have been used to supply irrigation liquids such as water or liquid fertilizer to the plants grown on the soil in the agricultural land, plantation and the like. Regulation of the supply speed of the irrigation liquid with the drip irrigation device enables the saving of the irrigation liquid as well as the management of the growth of the plants.

Such a drip irrigation device includes a drip irrigation dripper. The drip irrigation dripper controls the ejection amount of the irrigation liquid per unit time when ejecting the irrigation liquid having flowed into a flow tube from the water source side (pump side) toward the plants.

One known example of such a drip irrigation dripper is what is called an on-line dripper (see, e.g., PTLS 1 and 2).

On-line drippers are used while being inserted into holes bored in a tube wall (side wall) of polyethylene pipe or into the opening of the end portion of a microtube. On-line drippers are suitable not only for soil culture but also for nutriculture or pot culture when used for greenhouse culture, raising seedling, fruit growing, and the like.

Some on-line drippers have what is called a differential pressure control mechanism (pressure correction function). The drip irrigation dripper is composed of the following three members: an elastic film (e.g., silicone rubber film) such as a diaphragm; an inlet side member and; an outlet side member, as with drip irrigation drippers (emitters) disclosed for example in PTLS 1 and 2. The drip irrigation drippers disclosed in PTLS 1 and 2 have a structure in which the film is sandwiched by the inlet side member and the outlet side member.

The drip irrigation drippers disclosed in PTLS 1 and 2 utilize the operation of the diaphragm (film) in accordance with the liquid pressure of the irrigation liquid having flowed from the inlet to regulate the flow of the irrigation liquid toward a pressure reduction channel on the downstream side of the inlet under low liquid pressure and to control the amount of the outflow of the irrigation liquid from the outlet under high liquid pressure.

More specifically, in the drip irrigation drippers disclosed in PTLS 1 and 2, for example, when the liquid pressure of the irrigation liquid toward the inlet is increased, the diaphragm disposed to block the pressure reduction channel is deflected by the liquid pressure toward the outlet, thereby opening the reduction pressure channel to allow the irrigation liquid to flow into the pressure reduction channel. The irrigation liquid thus having flowed into the pressure reduction channel flows toward the outlet while the pressure of the irrigation liquid is reduced in the pressure reduction channel, and then flows out of the drip irrigation dripper from the outlet. When the liquid pressure toward the inlet is further increased, the amount of the deflection of the diaphragm toward the outlet becomes larger. In association with the larger amount of the deflection of the diaphragm, the sectional size of the channel at the outlet is decreased, and thus the outflow of the irrigation liquid is controlled.

CITATION LIST

Patent Literature

PTL 1
U.S. Pat. No. 5,413,282
PTL 2
U.S. Pat. No. 5,820,029

SUMMARY OF INVENTION

Technical Problem

However, the drip irrigation drippers disclosed in PTLS 1 and 2 have the following problems.
First Problem
In the drip irrigation drippers disclosed in PTLS 1 and 2, when an error occurs upon assembly of the above-mentioned three components, the assembly error greatly affects the performance of the drip irrigation drippers, resulting in variation in the operation of the diaphragm (film), causing the ejection amount or the flow regulation of the irrigation liquid particularly under low liquid pressure to be unstable.
Second Problem
The drip irrigation drippers disclosed in PTLS 1 and 2 require higher material cost when silicone rubber is used for the diaphragm.
Third Problem
The drip irrigation drippers disclosed in PTLS 1 and 2 have difficulty in enhancing the manufacturing efficiency thereof, since it is required to precisely assemble the three components which have been separately manufactured.

Therefore, an object of the present invention is to provide a drip irrigation dripper which makes it possible to stabilize the ejection amount or the flow regulation of the irrigation liquid and to achieve cost reduction and the enhancement of the manufacturing efficiency, and a drip irrigation device including the drip irrigation dripper.

Solution to Problem

The drip irrigation dripper of the present invention is a drip irrigation dripper that performs drip irrigation by controlling an ejection amount when ejecting irrigation liquid flowing from an inflow part out of an ejection port, the drip irrigation dripper including a first member integrally formed of a resin material on the inflow part side, and a second member integrally formed of a resin material on the ejection port side, the first member and the second member being brought into close contact with and fixed to each other, wherein the first member includes a first plate-like part having a first inner surface to be brought into close contact with the second member and a first outer surface opposite to the first inner surface, and a tube part being protruded from the first outer surface of the first plate-like part and having the inflow part being formed, the tube part configured to guide the irrigation liquid flowing from the inflow part to an inter-member channel, and the second member includes a second plate-like part having a second inner surface to be brought into close contact with the first inner surface and a second outer surface opposite to the second inner surface, and the ejection port, the first member further includes a flow regulating valve part that is disposed to be exposed to the first inner surface side to block a downstream end inside the tube part and that regulates a flow of the irrigation liquid guided by the tube part toward the ejection port at a lower limit of a liquid pressure of the irrigation liquid, or the inter-member channel being formed between the first member and the second member, the inter-member channel having surface shapes of close contact surfaces of both the members and being in communication with the inflow part and the ejection port, and the second member further includes a flow rate controlling valve part that controls a flow rate of the irrigation liquid having reached a downstream end of the inter-member channel toward the ejection port.

The flow regulating valve part may include a plate-like first valve element to be exposed to the liquid pressure of the guided irrigation liquid, and a first slit formed on the first valve element to allow the flow of the guided irrigation liquid, wherein the first slit may be formed to have an opening width of zero when the first valve element is not exposed to the liquid pressure, and the first valve element may inhibit the flow by maintaining the opening width of the first slit at zero without deformation of the first valve element when the liquid pressure is less than the lower limit, and the first valve element may allow the flow by expanding the first slit to have an opening width of more than zero through deformation of the first valve element when the liquid pressure is equal to or more than the lower limit.

The first slit may be formed radially to thereby divide the first valve element into a plurality of first valve segments.

The first valve element may be formed to have a shape protruded toward the second member.

The first valve element may be formed such that a central portion of the first valve element is protruded the most, and the first slit may be formed radially around the central portion.

The first valve element may be formed to have a dome shape.

The drip irrigation dripper of the present invention may include an inter-member channel formed between the first member and the second member through a close contact between the first inner surface and the second inner surface to allow the irrigation liquid passing through the flow regulating valve part to flow toward the ejection port.

The inter-member channel may have a pressure reduction channel that allows the irrigation liquid passing through the flow regulating valve part to flow while reducing a pressure of the irrigation liquid.

The second member may include a flow rate controlling valve part that controls a flow rate of the irrigation liquid having reached a downstream end of the inter-member channel toward the ejection port.

The flow rate controlling valve part may include a plate-like second valve element to be exposed to a liquid pressure of the irrigation liquid having reached the plate-like second valve element, and a second slit formed on the second valve element to allow the irrigation liquid having reached the second valve element to flow toward the ejection port, wherein the second slit may be formed to have a predetermined opening width when the second valve element is not exposed to the liquid pressure, and the second valve element may decrease the opening width of the second slit such that an amount of the decrease becomes larger relative to the predetermined opening width as the liquid pressure becomes larger through deformation of the second valve element depending on the liquid pressure.

The flow rate controlling valve part may include a plate-like second valve element to be exposed to a liquid pressure of the irrigation liquid having reached the plate-like second valve element, and a second slit formed on the second valve element to allow the irrigation liquid having reached the second valve element to flow toward the ejection port, wherein the second slit may be formed to have a predetermined opening width when the second valve element is not exposed to the liquid pressure, and the second valve element may decrease the opening width of the second slit such that an amount of the decrease becomes larger relative to the predetermined opening width as the liquid pressure becomes larger through deformation of the second valve element depending on the liquid pressure.

The second valve element may be formed to have a shape protruded toward a side opposite to the ejection port, and the second slit may be formed radially to thereby divide the second valve element into a plurality of second valve segments.

The second valve element may be formed such that a central portion of the second valve element is protruded the most, and the second slit may be formed radially around the central portion.

The second valve element may be formed to have a dome shape.

The inter-member channel may have a pressure reduction channel that allows the irrigation liquid to flow while reducing a pressure of the irrigation liquid.

The first member may include a flow regulating valve part that is disposed to be exposed to the first inner surface side to block a downstream end inside the tube part and that regulates a flow of the irrigation liquid guided by the tube part into the inter-member channel at a lower limit of a liquid pressure of the irrigation liquid.

The flow regulating valve part may include a plate-like first valve element to be exposed to a liquid pressure of the guided irrigation liquid, and a first slit formed on the first valve element to allow the flow of the guided irrigation liquid, wherein the first slit may be formed to have an opening width of zero when the first valve element is not exposed to the liquid pressure, and the first valve element may inhibit the flow by maintaining the opening width of the first slit at zero without deformation of the first valve element when the liquid pressure is less than the lower limit, and the first valve element may allow the flow by expanding the first slit to have an opening width of more than zero through deformation of the first valve element when the liquid pressure is equal to or more than the lower limit.

The inflow part may be formed to have hydrophobicity to thereby inhibit an inflow of the irrigation liquid having a liquid pressure of less than the lower limit.

The inter-member channel may be formed of a space interposed between a recessed surface disposed on one of the first inner surface and the second inner surface, and a planar surface or a recessed surface, facing the recessed surface, disposed on the other one of the first inner surface and the second inner surface.

The ejection port may be formed on the second outer surface or in a second tube part protruded from the second outer surface.

A drip irrigation device of the present invention includes the drip irrigation dripper of the present invention, and an elongated flow tube through which the irrigation liquid flows, wherein the drip irrigation dripper is inserted into a tube wall or an opening of the flow tube through the tube part to thereby allow the irrigation liquid inside the flow tube to flow into a channel of the drip irrigation dripper from the inflow part.

According to the above-described configurations, a drip irrigation dripper having the function of controlling the ejection flow rate of irrigation liquid under high or low liquid pressure can be manufactured with less assembly error with only two components made of a resin material, thus making it possible to stabilize the ejection amount, and to achieve cost reduction due to reduction in the manufacturing cost and the enhancement of the manufacturing efficiency as a result of the removal of a highly precise assembling step. The flow rate controlling valve part or flow regulating valve part can be easily configured, thus making it possible to further reduce the cost. A plurality of second valve segments are deformed toward the center of the radial second slit while reducing an amount of protrusion toward the side opposite to the ejection port due to the liquid pressure, which allows the opening width of the second slit to be narrower, thus enabling the flow rate controlling valve part to be formed into a simple shape suitable for narrowing the opening width of the slit depending on the liquid pressure of the irrigation liquid, making it possible to achieve further suitable flow rate control and further cost reduction. A suitable configuration can be selected for synchronizing the deforming movements of the first or second valve segments by equalizing the size of each valve segment, thus making it possible to achieve further simple flow rate control and further cost reduction. The first valve element or second valve element can be formed into further simple shape, thus making it possible to achieve further cost reduction. The decompression of the irrigation liquid makes it possible to achieve further suitable ejection speed. The drip irrigation dripper provided with a function of regulating the flow of the irrigation liquid under high or low liquid pressure can be manufactured with less assembly error with only two components made of a resin material, thus making it possible to stabilize the flow regulation. The flow regulating valve part can be easily configured, thus making it possible to further reduce the cost. The lower limit of the liquid pressure of the irrigation liquid flowing from the inflow part can be controlled with the hydrophobicity of the inflow part, thus making it possible to properly perform flow regulation under low liquid pressure with a simple configuration. The surface shape for forming the inter-member channel can be produced on both inner surfaces without difficulty in terms of manufacturability, thus making it possible to enhance the manufacturing efficiency and the yield rate. A plurality of first valve segments is deformed toward the second member and in a radiation direction from the center of the first slit (outwardly in a radial direction) due to the liquid pressure, which allows the opening width of the first slit to be wider, thus enabling the flow regulating valve part to be formed into a simple shape suitable for expanding the first slit depending on the liquid pressure of the irrigation liquid, making it possible to achieve further suitable flow regulation and further cost reduction. Securing more contact area between each first valve segment and the irrigation liquid enables the force affecting each valve segment and expanding the first slit to be greater when each valve segment is exposed to the liquid pressure, thus making it possible to securely deform each valve segment and properly expand the first slit even when the irritation liquid has only low pressure. The inner surfaces of two components in close contact with each other can be utilized to efficiently form a channel between the two components. When the ejection port is directly formed on the second outer surface, it is possible to reduce the amount of materials to be used to achieve further cost reduction. On the other hand, when the ejection port is formed in the second tube part, it is possible to easily cope with multiple usage modes such as optimization of the flow direction of the ejected irrigation liquid by connecting a tube to the second tube part, for example. It is possible to stabilize the ejection amount, and to achieve a cost reduction due to reduction in the manufacturing cost and the enhancement of the manufacturing efficiency as a result of the removal of a highly precise assembling step.

Advantageous Effects of Invention

With the present invention, it is possible to stabilize the ejection amount or flow regulation of the irrigation liquid, and to achieve cost reduction and the enhancement of the manufacturing efficiency.

DESCRIPTION OF EMBODIMENTS

In the following, an embodiment of a drip irrigation dripper according to the present invention and a drip irrigation device including the drip irrigation dripper will be described with reference to FIGS. 1 to 17.

Figure 1:
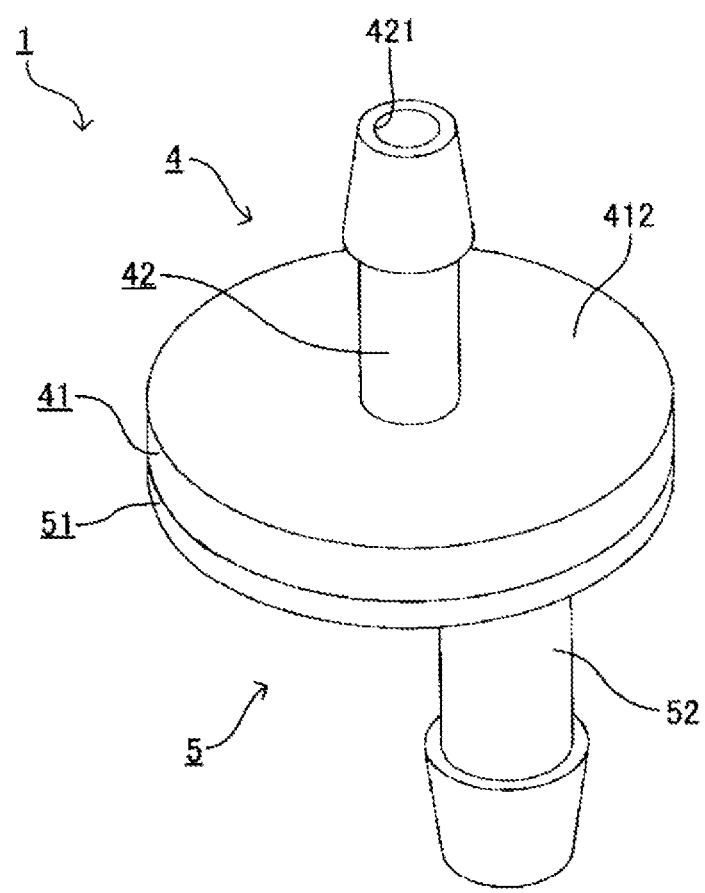
FIG. 1 is a perspective bird's-eye view illustrating a configuration of a drip irrigation dripper according to the present invention.
Figure 2:
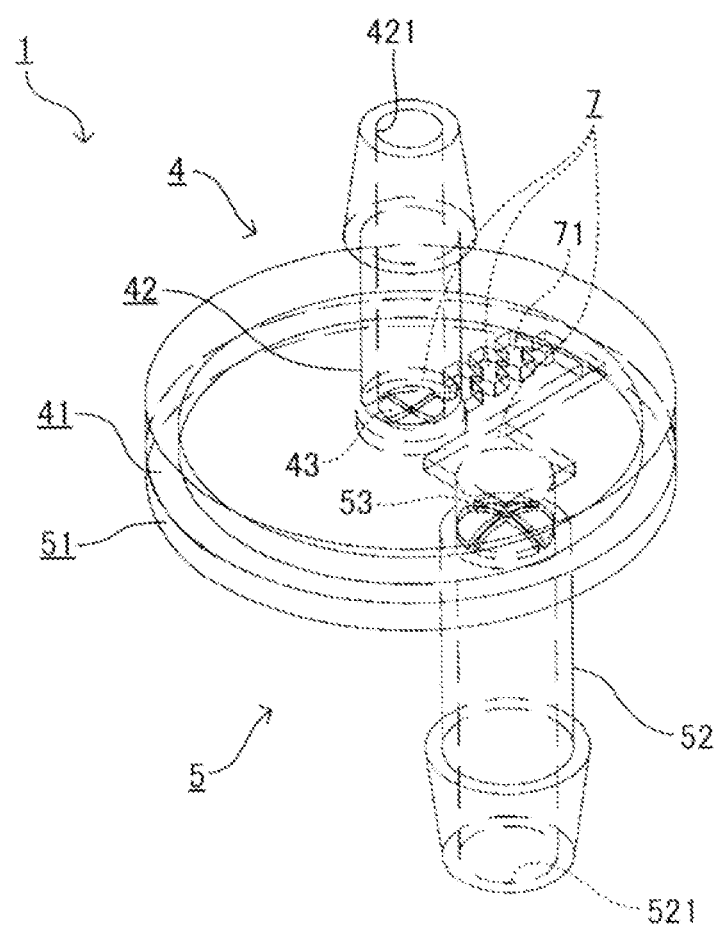
FIG. 2 is a transparent view of the drip irrigation dripper illustrated in FIG. 1.
Figure 3:
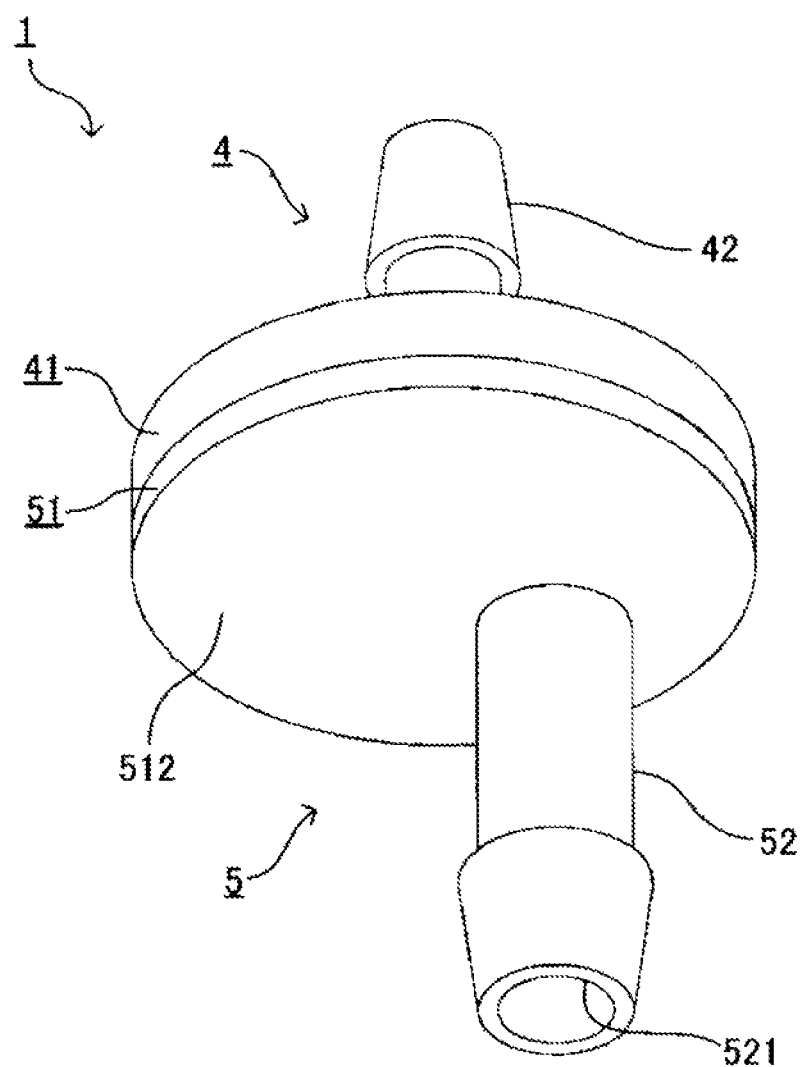
FIG. 3 is a perspective upward view of the drip irrigation dripper illustrated in FIG. 1.
Figure 4:
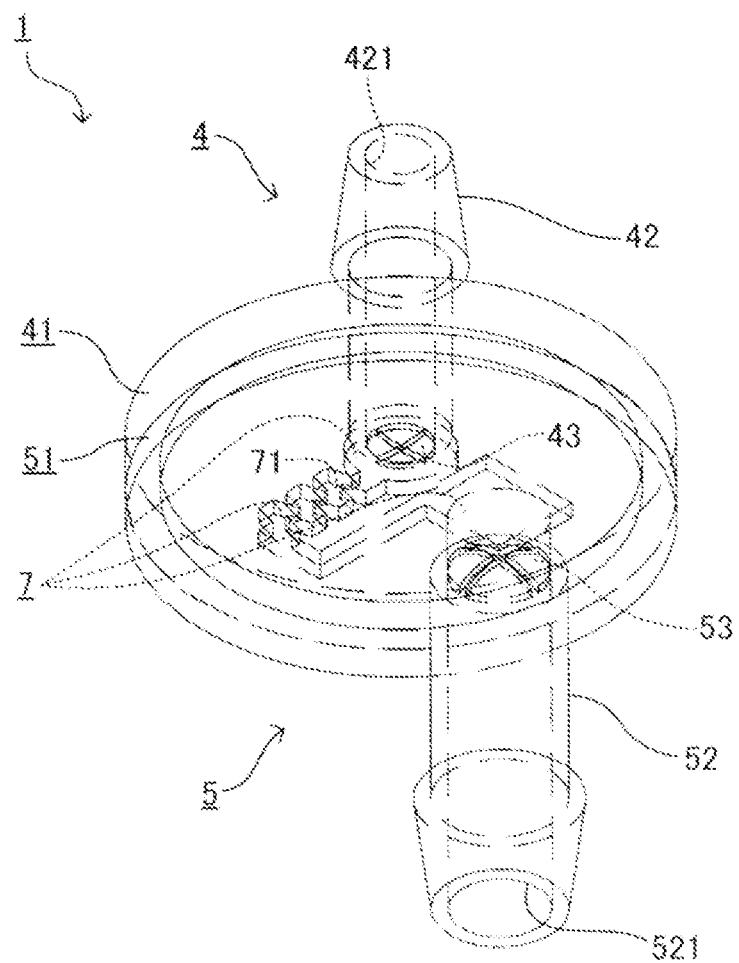
FIG. 4 is a transparent view of the drip irrigation dripper illustrated in FIG. 3.
Figure 5:
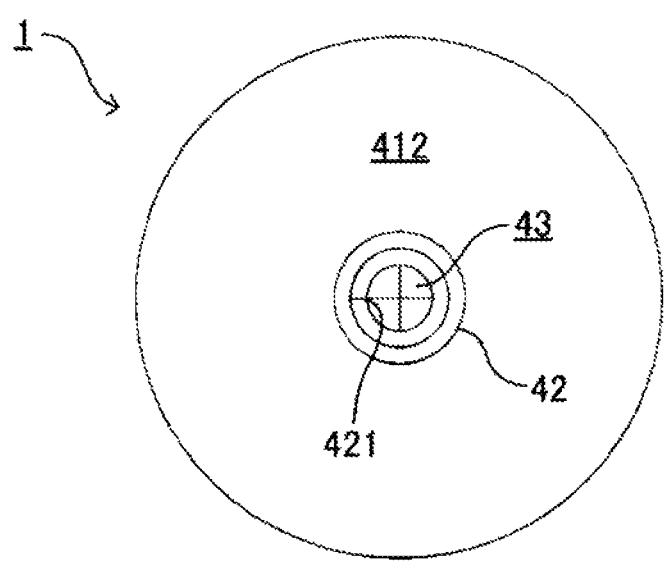
FIG. 5 is a plan view of the drip irrigation dripper illustrated in FIG. 1.
Figure 6:
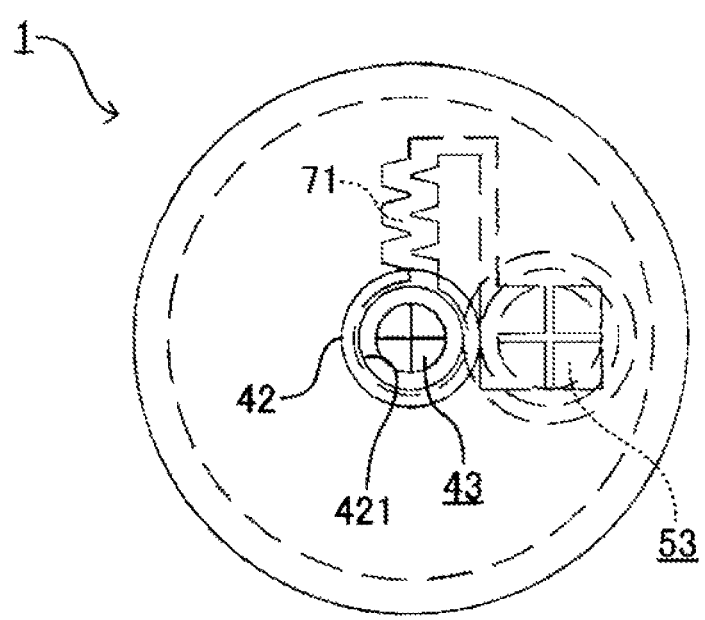
FIG. 6 is a transparent view of the drip irrigation dripper illustrated in FIG. 5.
Figure 7:
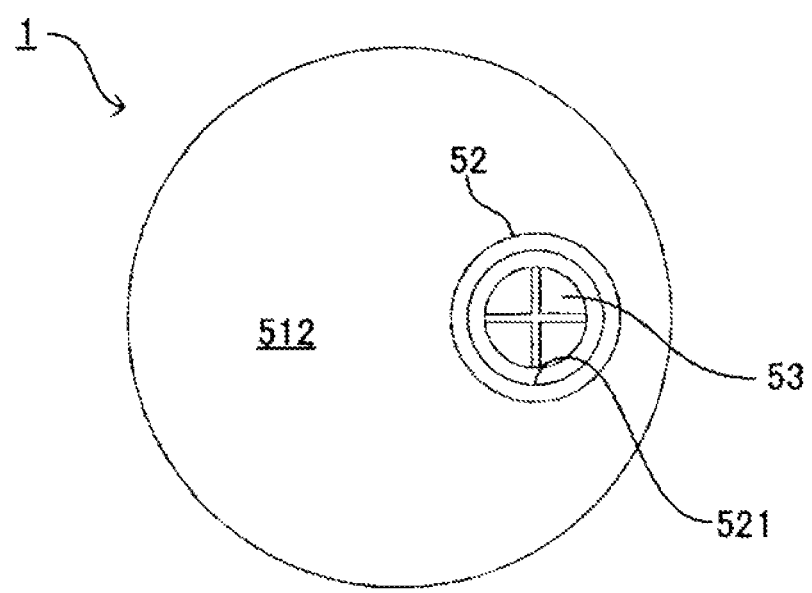
FIG. 7 is a bottom view of the drip irrigation dripper illustrated in FIG. 1.
Figure 8:
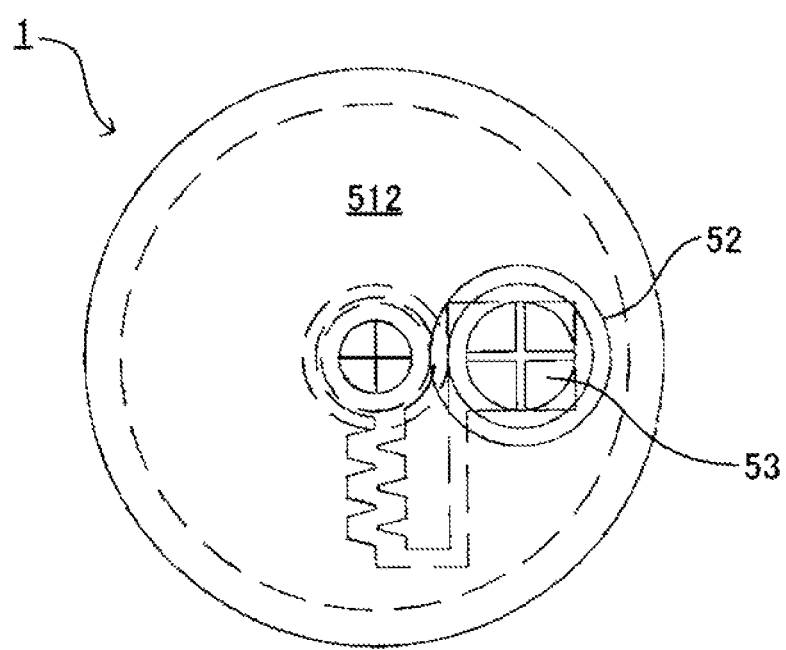
FIG. 8 is a transparent view of the drip irrigation dripper illustrated in FIG. 7.
Figure 9:
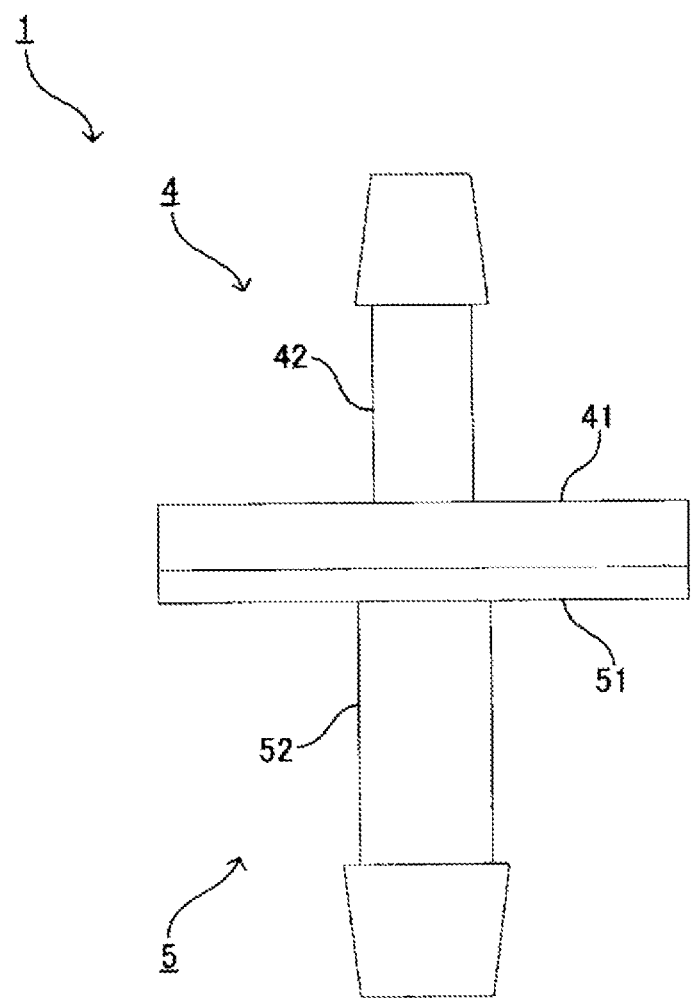
FIG. 9 is a front view of the drip irrigation dripper illustrated in FIG. 1.
Figure 10:
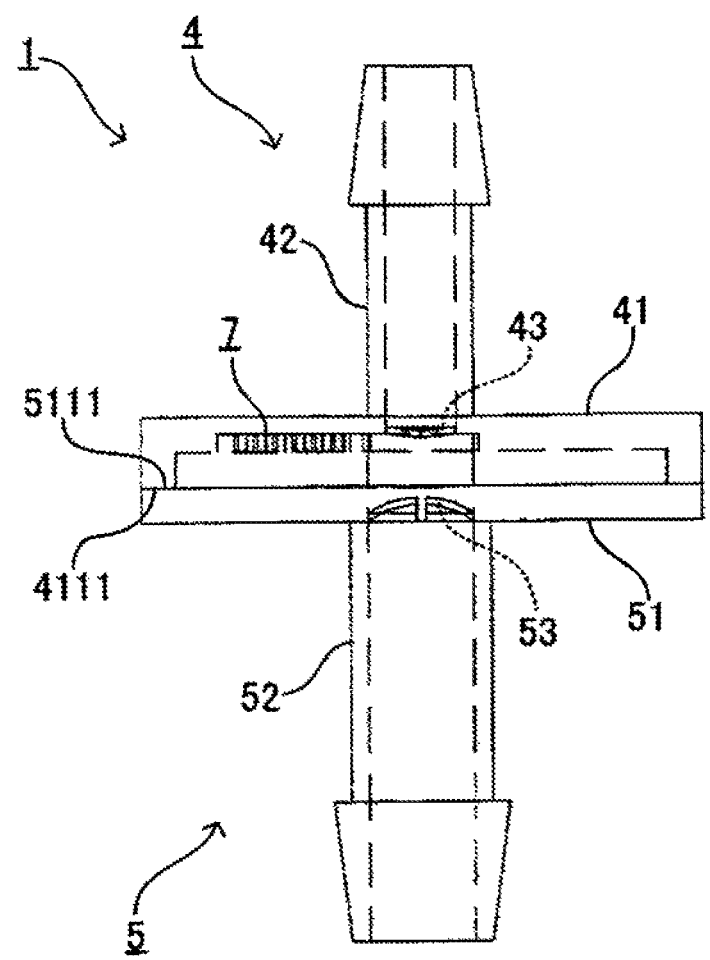
FIG. 10 is a transparent view of the drip irrigation dripper illustrated in FIG. 9.
Figure 11:
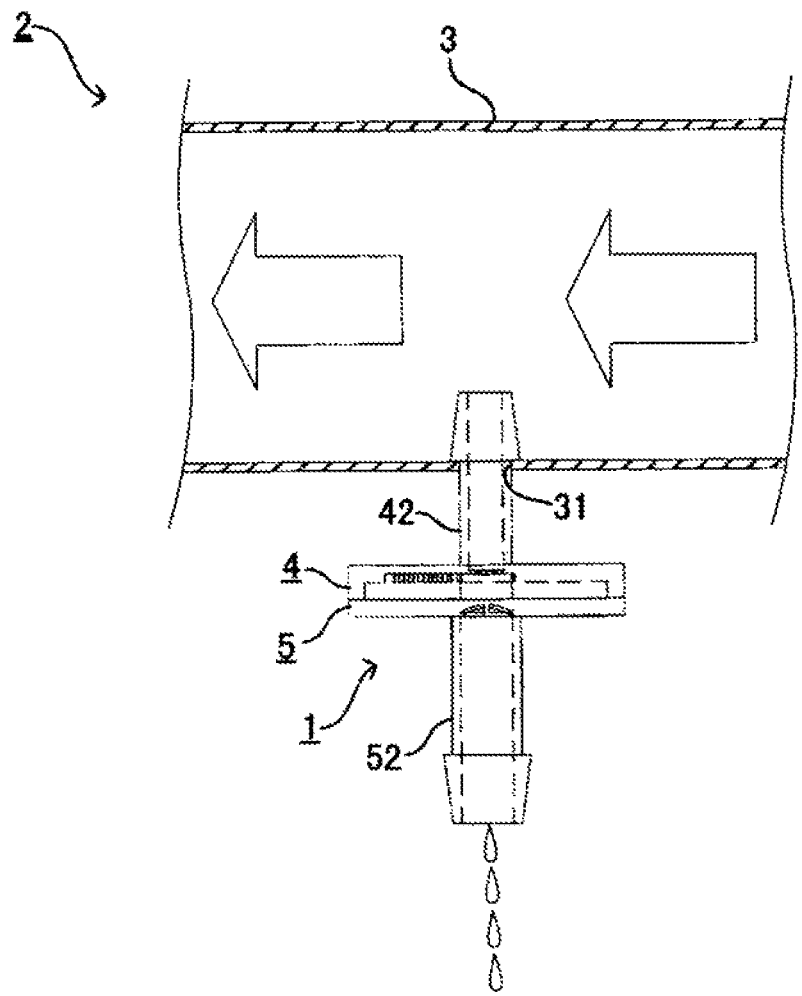
FIG. 11 is a schematic sectional view illustrating a configuration of a drip irrigation device according to the present invention.
Figure 12:
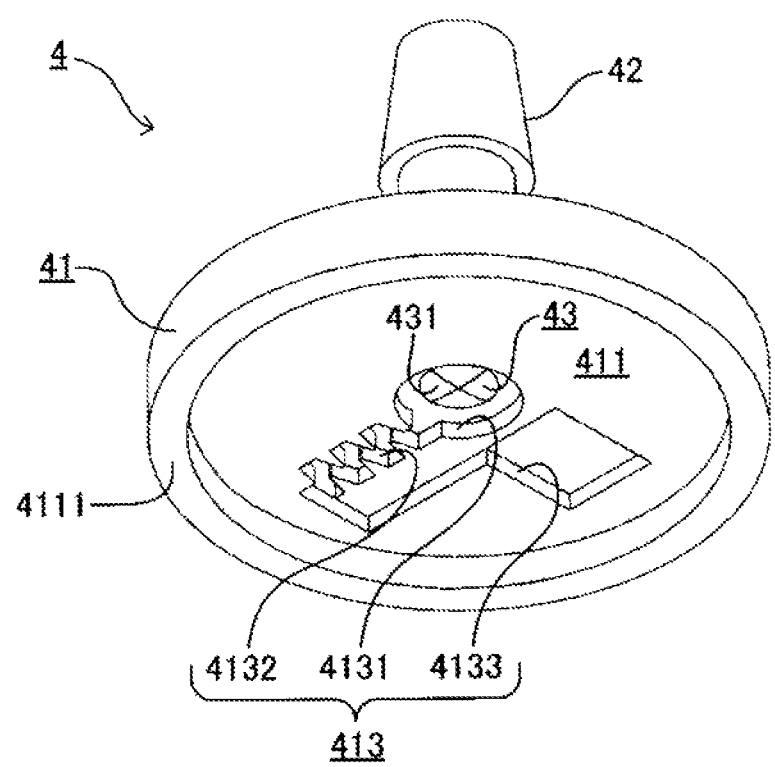
FIG. 12 is a perspective upward view of a first member.
Figure 13:
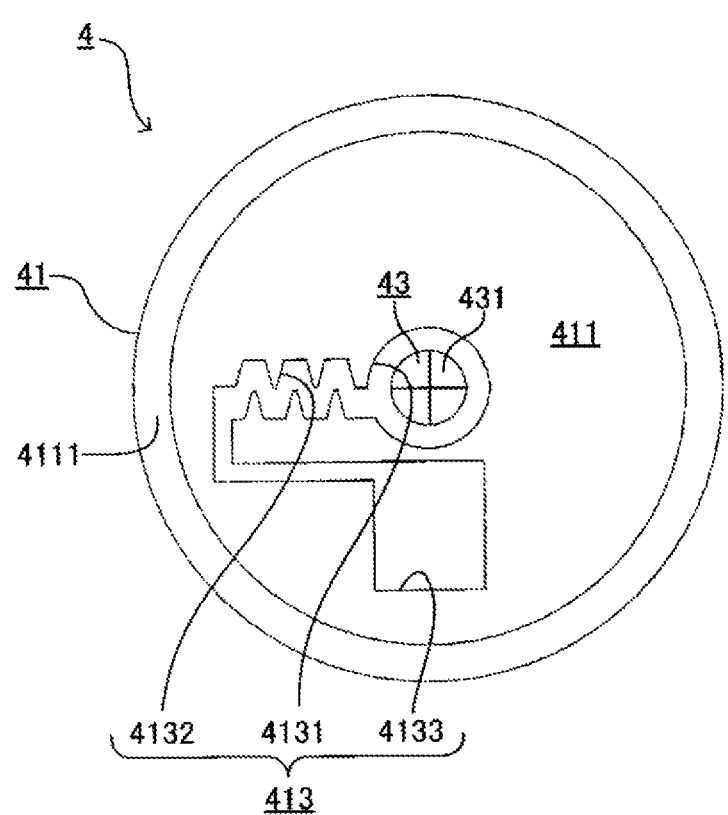
FIG. 13 is a bottom view of the first member.
Figure 14:
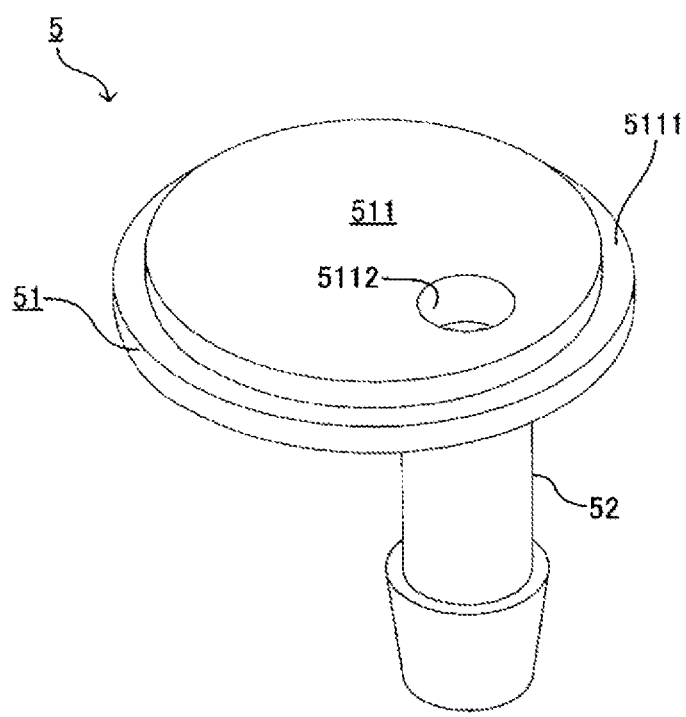
FIG. 14 is a perspective bird's-eye view of a second member.
Figure 15:
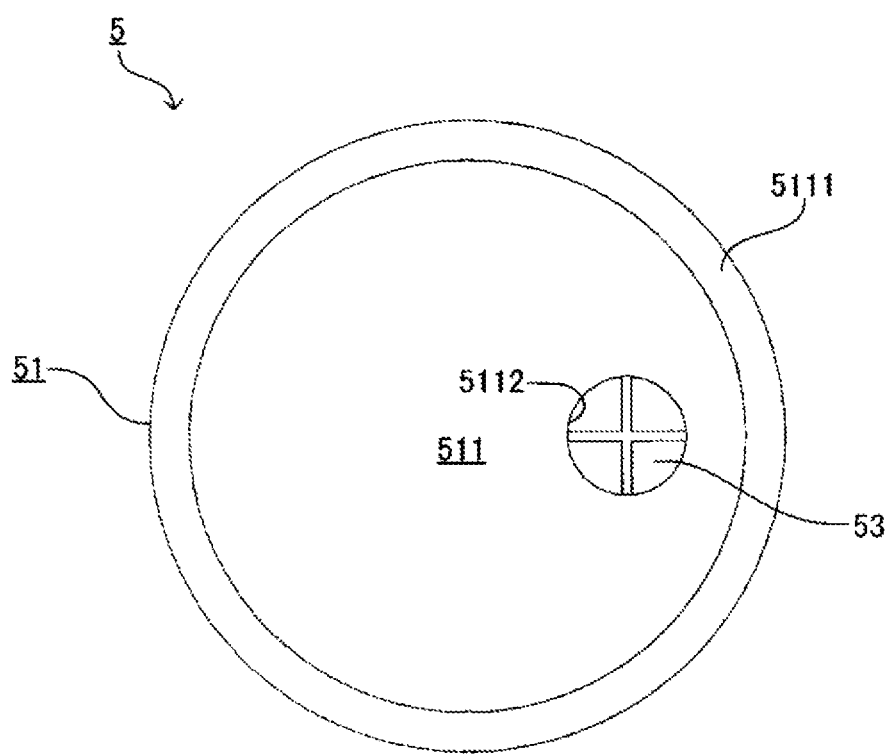
FIG. 15 is a plan view of the second member.
Figure 16B:
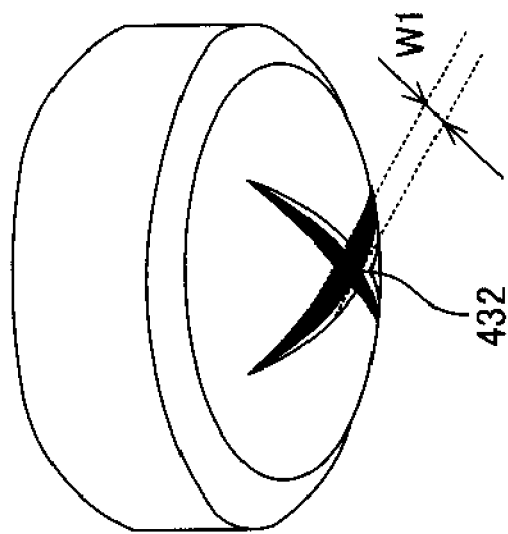
FIGS. 16A and 16B are enlarged perspective views of a flow regulating valve part.
Figure 16A:
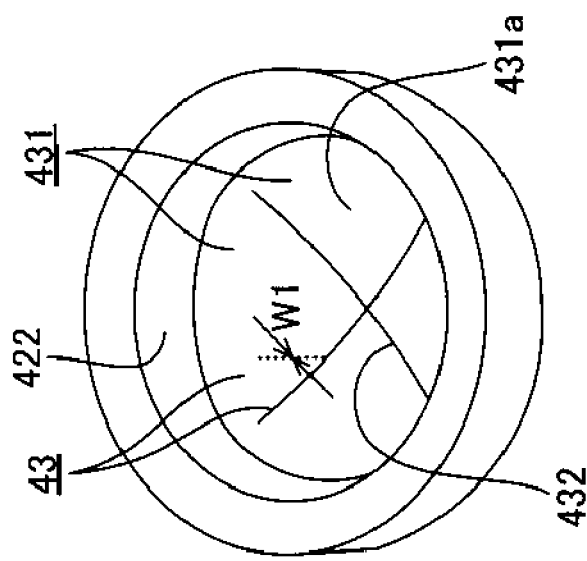
Figures 17A, 17B:
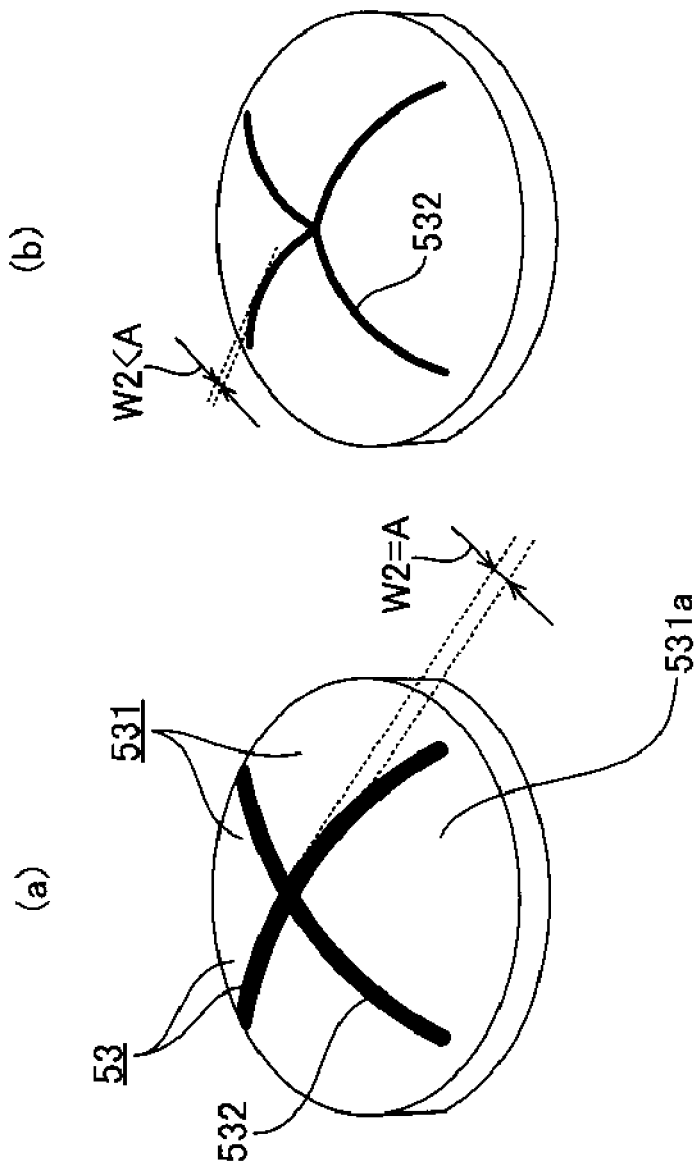
FIGS. 17A and 17B are enlarged perspective views of a flow rate controlling valve part.

FIG. 1 is a perspective bird's-eye view illustrating the configuration of a drip irrigation dripper according to the present invention. FIG. 2 is a transparent view of the drip irrigation dripper illustrated in FIG. 1. FIG. 3 is a perspective upward view of the drip irrigation dripper illustrated in FIG. 1. FIG. 4 is a transparent view of the drip irrigation dripper illustrated in FIG. 3. FIG. 5 is a plan view of the drip irrigation dripper illustrated in FIG. 1. FIG. 6 is a transparent view of the drip irrigation dripper illustrated in FIG. 5. FIG. 7 is a bottom view of the drip irrigation dripper illustrated in FIG. 1. FIG. 8 is a transparent view of the drip irrigation dripper illustrated in FIG. 7. FIG. 9 is a front view of the drip irrigation dripper illustrated in FIG. 1. FIG. 10 is a transparent view of the drip irrigation dripper illustrated in FIG. 9. FIG. 11 is a schematic sectional view illustrating the configuration of a drip irrigation device according to the present invention. FIG. 12 is a perspective upward view of a first member. FIG. 13 is a bottom view of the first member. FIG. 14 is a perspective bird's-eye view of a second member. FIG. 15 is a plan view of the second member. FIGS. 16A and 16B are enlarged perspective views of a flow regulating valve part. FIGS. 17A and 17B are enlarged perspective views of a flow rate controlling valve part.

As illustrated in FIG. 11, drip irrigation device 2 includes elongated tube 3 as a flow tube through which the irrigation liquid flows, and drip irrigation dripper 1 inserted into tube 3 through through-hole 31 bored in the side wall of tube 3.

Drip irrigation dripper 1, being inserted into tube 3, controls the ejection amount of the irrigation liquid per unit time when the irrigation liquid inside tube 3 is ejected out of tube 3.

It is noted that, while one drip irrigation dripper 1 and one through-hole 31 are illustrated in FIG. 11, in actual drip irrigation device 2, a plurality of drip irrigation drippers 1 and a plurality of through-holes 31 are often disposed along the length of tube 3 at predetermined intervals.

In addition, in FIG. 11, the right and left sides of the channel in tube 3 correspond to the upstream side and the downstream side, respectively.

Next, drip irrigation dripper 1 will be described in detail. As illustrated in FIGS. 1 to 4, 9 and 10, drip irrigation dripper 1 includes first member 4 and second member 5. Drip irrigation dripper 1 is assembled by fixing first member 4 and second member 5 together in a close contact state. The method of fixing first member 4 and second member 5 may be joining by means of adhesion using an adhesive, welding, or the like, or alternatively may be pressure joining by means of pressing. Each of first member 4 and second member 5 is integrally formed of a resin material. It is noted that first member 4 and second member 5 may be formed of the same resin material, or alternatively may be formed of different resin materials. Examples of the resin material include an inexpensive resin material such as polypropylene. Each of first member 4 and second member 5 may be integrally molded by injection molding.

[Specific Configuration of First Member]
<First Plate-Like Part>

As illustrated in FIGS. 1 to 4, 12 and 13, first member 4 includes first plate-like part 41. The shape of first plate-like part 41 is not particularly limited, and either may be a disc shape, or may be rectangular or other polygonal plate shapes. In the present embodiment, the shape of first plate-like part 41 is a disc shape First plate-like part 41 has first inner surface (lower surface in FIG. 12) 411 to be brought into close contact with second member 5, and first outer surface (top surface in FIG. 1) 412 opposite to first inner surface 411.

First inner surface 411 and first outer surface 412 are formed across the thickness of first plate-like part 41. First inner surface 411 and first outer surface 412 are planes parallel to each other.

As illustrated in FIGS. 12 and 13, first recess 4131 having a circular shape in a plan view is formed at the center of first inner surface 411. As illustrated in FIG. 12, rim part 4111 of first inner surface 411 is protruded toward second member 5 (downward in FIG. 12).

<Tube Part and Inflow Part>

As illustrated in FIGS. 1 to 6 and 9 to 12, first member 4 includes tubular first tube part 42. First tube part 42 is protruded from the center portion of first outer surface 412 of first plate-like part 41 toward the side opposite to second member 5 (upward in FIGS. 1 to 4). First tube part 42 is formed integrally with first plate-like part 41. In addition, the outer peripheral surface of first tube part 42 is formed to be a cylindrical surface in a predetermined range from the base end portion (lower end portion) to a point before the tip portion (upper end portion) in the protrusion direction. In addition, the outer peripheral surface of first tube part 42 is formed to be a truncated cone surface swollen outwardly in the radial direction from the cylindrical surface in a predetermined range of the tip portion side. The truncated cone surface functions as a stopper when drip irrigation dripper 1 is inserted into tube 3 (see FIG. 11). However, the outer peripheral surface of the first tube part 42 is not limited to the cylindrical surface or the truncated cone surface, and may be a square tube surface, a prismoid surface, or the like. The tip portion of first tube part 42 has inflow port 421 formed therein as an inflow portion.

<Flow Regulating Valve Part>

As illustrated in FIGS. 2, 4 to 6, 12 and 13, first member 4 includes flow regulating valve part 43. Flow regulating valve part 43 blocks the downstream end inside first tube part 42. In addition, flow regulating valve part 43 is exposed to first inner surface 411 side. Flow regulating valve part 43 regulates the flow of the irrigation liquid guided by first tube part 42 toward ejection port 521 (see FIG. 3). Flow regulating valve part 43 regulates the flow of the irrigation liquid when the liquid pressure of the irrigation liquid is less than a predetermined lower limit.

Specifically, as illustrated in FIGS. 16A and 16B, flow regulating valve part 43 has plate-like first valve element 431 to be exposed to the liquid pressure of the irrigation liquid guided by first tube part 42, and first slit 432 formed on first valve element 431 to allow the flow of the irrigation liquid.

More specifically, as illustrated in FIGS. 16A and 16B, first valve element 431 is internally connected to the lower end of inner peripheral surface 422 of first tube part 42. In addition, first valve element 431 is formed to have the shape of a thin wall dome of which central portion is protruded the most toward second member 5 (downward) from the lower end of inner peripheral surface 422 of first tube part 42. It is noted that first valve element 431 is formed on the bottom surface of first recess 4131 formed in first inner surface 411 such that the central portion (apex) of first valve element 431 should not interfere with second member 5 (see FIG. 12). In addition, as illustrated in FIGS. 12 and 13, the surface of first valve element 431 on second member 5 side (lower surface in FIG. 12) constitutes a portion of a predetermined range around the center on the inner bottom surface of first recess 4131.

As illustrated in FIGS. 16A and 16B, first slit 432 is formed radially (in a cross shape, in FIGS. 16A and 16B)

and concentrically with first valve element 431. First valve element 431 is equally divided into a plurality of (four, in FIGS. 16A and 16B) first valve segments 431a by first slit 432.

As illustrated in FIG. 16A, first slit 432 is formed such that, when first valve element 431 is not exposed to the liquid pressure of the irrigation liquid, opening width W1 being the width of first slit 432 is zero. Such a configuration may be obtained by forming first slit 432 as an incision not having a gap originally.

When the liquid pressure is less than a set lower limit, the rigidity of first valve element 431 surpasses the liquid pressure, so that first valve element 431 does not undergo elastic deformation toward second member 5. Thus, as illustrated in FIG. 16A, first valve element 431 can maintain opening width W1 of first slit 432 at zero. In this case, the flow of the irrigation liquid through first slit 432 is inhibited (blocked). It is noted that the lower limit may be, for example, 0.005 MPa.

On the other hand, when the liquid pressure is equal to or more than the above-described lower limit, first valve element 431 yields to the liquid pressure to undergo elastic deformation toward second member 5. Thus, as illustrated in FIG. 16B, first valve element 431 expands first slit 432 such that opening width W1 is greater than zero to allow the flow of the irrigation liquid through first slit 432.

<Inter-Member Channel Part>

As illustrated in FIGS. 12 and 13, first member 4 has inter-member channel part 413 of a recessed surface formed in first inner surface 411 of first plate-like part 41.

As illustrated in FIG. 13, inter-member channel part 413 has first recess 4131 described above, pressure reduction channel part 4132 continuously connected to the terminal end (downstream end) of first recess 4131, and rectangular second recess 4133 continuously connected to the terminal end of pressure reduction channel part 4132.

Specifically, as illustrated in FIG. 13, pressure reduction channel part 4132 is formed substantially U-shape. Pressure reduction channel part 4132 extends outwardly in a serpentine manner in the radial direction of first inner surface 411 from a part of the circumference of first recess 4131 (left end portion in FIG. 13), and then turns back before rim part 4111 of first inner surface 411 to return to the vicinity of first recess 4131 without serpentine.

Inter-member channel part 413 forms inter-member channel 7 (see FIG. 2), being in communication with inflow port 421 and ejection port 521, together with second member 5. Out of inter-member channel 7, pressure reduction channel part 4132 being a part of inter-member channel 7 forms, together with second member 5, pressure reduction channel 71 that allows the irrigation liquid having passed through flow regulating valve part 43 to flow toward ejection port 521 while reducing the pressure of the irrigation liquid.

It is noted that the shape of pressure reduction channel part 4132 is not limited to the shape illustrated in FIGS. 12 and 13. In addition, a plurality of pressure reduction channel parts 4132 may be provided.

[Specific Configuration of Second Member]
<Second Plate-Like Part>

As illustrated in FIGS. 1 to 4, 14 and 15, second member 5 has disc-shaped second plate-like part 51 being concentric with and having the same diameter as that of first plate-like part 41. However, the shape of the second plate-like part 51 does not need to be limited to a disc shape, and may be, for example, rectangular or other polygonal plate shapes.

Second plate-like part 51 has second inner surface (top surface in FIG. 14) 511 to be brought into close contact with first inner surface 411 of first plate-like part 41, and second outer surface (lower surface in FIG. 3) 512 opposite to second inner surface 511.

Second inner surface 511 and second outer surface 512 are disposed across the thickness of second plate-like part 51. Second inner surface 511 and second outer surface 512 are planes parallel to each other.

In addition, second inner surface 511 and first inner surface 411 are brought into close contact with each other, thereby to form inter-member channel 7, formed by surface shapes of close contact surfaces 411 and 511, between first member 4 and second member 5. That is, inter-member channel 7 is formed of a space interposed between first recess 4131 (recessed surface) and second inner surface 511 (planar surface), a space interposed between pressure reduction channel part 4132 (recessed surface) and second inner surface 511 (planar surface) (i.e., pressure reduction channel 71), and a space interposed between second recess 4133 (recessed surface) and second inner surface 511 (planar surface) as well as third recess 5112 (recessed surface) to be described later.

It is noted that second inner surface 511 may be joined to first inner surface 411.

As for other components, rim part 5111 of second inner surface 511 is recessed by the same dimension as the protrusion dimension of rim part 4111 of first inner surface 411 (see FIG. 10). It is also possible to use rim parts 4111 and 5111 for positioning first member 4 and second member 5. In addition, as illustrated in FIG. 14, third recess 5112 having a circular shape in a plan view is formed at a position deviated outwardly in a radial direction from the center of second inner surface 511. Third recess 5112 faces second recess 4133 when first member 4 and second member 5 are fixed together.

<Second Tube Part and Ejection Port>

As illustrated in FIGS. 1 to 4, and 7 to 10, second member 5 has tubular second tube part 52. As illustrated in FIG. 3, second tube part 52 is protruded toward the side opposite to first member 4 (downward in FIG. 3) from second outer surface 512 of second plate-like part 51, and is formed integrally with second plate-like part 51.

The outer peripheral surface of second tube part 52 is formed to be a cylindrical surface in a predetermined range from the base end portion (upper end portion) to a point before the tip portion (lower end portion) in the protrusion direction. In addition, the outer peripheral surface of second tube part 52 is formed to be a truncated cone surface swollen outwardly in the radial direction beyond the cylindrical surface in a predetermined range of the tip portion side. However, the outer peripheral surface of second tube part 52 does not need to be limited to the cylindrical surface or the truncated cone surface, and may be a square tube surface, a prismoid surface, or the like.

Ejection port 521 that opens circularly is formed in the tip portion of second tube part 52.

<Flow Rate Controlling Valve Part>

As illustrated in FIGS. 4, 7, 8 and 10, second member 5 includes flow rate controlling valve part 53. Flow rate controlling valve part 53 is disposed at the downstream end of inter-member channel 7 to partially block the upstream end inside second tube part 52. Flow rate controlling valve part 53 controls the flow rate of the irrigation liquid having reached the downstream end of inter-member channel 7 toward ejection port 521.

Specifically, as illustrated in FIGS. 17A and 17B, flow rate controlling valve part 53 has plate-like second valve element 531 to be exposed to the liquid pressure of the irrigation liquid having reached the downstream end of inter-member channel 7, and second slit 532 formed on second valve element 531 to allow the irrigation liquid to flow toward ejection port 521.

More specifically, as illustrated in FIGS. 17A and 17B, second valve element 531 is formed at a position from second inner surface 511 to third recess 5112 (see FIGS. 14 and 15) to have the shape of a thin wall dome of which central portion is protruded the most toward the side opposite to ejection port 521 (upward). In addition, as illustrated in FIGS. 17A and 17B, second slit 532 is formed radially (in a cross shape, in FIGS. 17A and 17B) around the central portion of second valve element 531. Second valve element 531 is equally divided into a plurality of (four, in FIGS. 17A and 17B) second valve segments 531*a* by second slit 532.

As illustrated in FIG. 17A, second slit 532 is formed such that, when not exposed to the liquid pressure of the irrigation liquid, opening width W2 of second slit 532 is predetermined opening width A greater than zero.

In addition, second valve element 531 undergoes deformation toward ejection port 521 (downward, in FIGS. 17A and 17B) depending on the liquid pressure, while being exposed to the liquid pressure of the irrigation liquid. Thus, as illustrated in FIG. 17B, second valve element 531 decreases opening width W2 of second slit 532 relative to predetermined opening width A such that the amount of the decrease becomes larger, as the liquid pressure becomes larger. However, there may be a lower limit of the irrigation liquid for initiating the deformation of second valve element 531.

[Principal Operation and Effect of Present Embodiment]

According to the present embodiment, the irrigation liquid inside tube 3 flows into first tube part 42 from inflow port 421, passes through the channel inside tube part 42, and reaches flow regulating valve part 43.

When the liquid pressure of the irrigation liquid having reached flow regulating valve part 43 does not amount to a set lower limit, the rigidity of first valve element 431 in flow regulating valve part 43 surpasses the liquid pressure, and thus first valve element 431 does not undergo elastic deformation. Consequently, opening width W1 of first slit 432 is maintained at zero (i.e., equivalent to the state where the liquid pressure has no influence), to inhibit the inflow of the irrigation liquid into inter-member channel 7.

On the other hand, when the liquid pressure of the irrigation liquid having reached flow regulating valve part 43 amounts to the set lower limit, the liquid pressure surpasses the rigidity of first valve element 431, and thus first valve element 431 (each first valve segment 431*a*) elastically deforms toward second member 5 (in other words, toward inter-member channel 7). Consequently, first slit 432 is expanded such that opening width W1 is increased from zero to a value in accordance with the liquid pressure, to allow the inflow of the irrigation liquid into inter-member channel 7.

In this manner, the irrigation liquid having flowed from flow regulating valve part 43 undergoes pressure reduction by pressure reduction channel 71 in the course of passing through inter-member channel 7, and then reaches flow rate controlling valve part 53.

Second valve element 531 of flow rate controlling valve part 53 elastically deforms toward ejection port 521 depending on the liquid pressure of the liquid having reached second valve element 531. Thus, second valve element 531 decreases opening width W2 of second slit 532, relative to opening width W2 in a state where the liquid pressure has no influence, such that the amount of the decrease becomes larger, as the liquid pressure becomes larger. It is noted that a suitable lower limit in accordance with the wall thickness of second valve element 531, the width of slit 532, and the like may be set as a lower limit of the internal liquid pressure for the elastic deformation of second valve element 531.

Thus, the irrigation liquid passing through the channel in second slit 532 and moving toward ejection port 521 all at once is regulated in terms of flow rate due to the decrease of opening width W2 in association with the elastic deformation of second valve element 531.

Two cases will now be discussed in which the liquid pressure of the irrigation liquid flowing into drip irrigation dripper 1 is relatively high or low. Causes of the occurrence of such two cases are: the position on tube 3 at which drip irrigation dripper 1 is attached (whether near to or distant from a pump); the performance of the pump itself (whether high pressure pump or low pressure pump), a change in the performance of the pump itself over time; and so forth.

First, when the irrigation liquid has high pressure, the amount of the inflow of the irrigation liquid into the channel of drip irrigation dripper 1 becomes relatively large. At the same time, relatively large amount of deformation of flow rate controlling valve part 53 also causes the flow rate regulated by flow rate controlling valve part 53 to be relatively large. Therefore, there is no such case where the ejection amount of the irrigation liquid from ejection port 521 becomes excessively large.

On the other hand, when the irrigation liquid has low pressure, the amount of the inflow of the irrigation liquid into the channel of drip irrigation dripper 1 becomes relatively small. At the same time, relatively small amount of deformation of flow rate controlling valve part 53 also causes the flow rate regulated by flow rate controlling valve part 53 to be relatively small. Therefore, there is no such case where the ejection amount of the irrigation liquid from ejection port 521 becomes excessively small.

Thus, drip irrigation dripper 1 can favorably control the ejection amount of the irrigation liquid from ejection port 521 to have less variation (to limit variation to 5 to 10%, for example), irrespective of the liquid pressure at the time of inflow.

According to the present embodiment, drip irrigation dripper 1 provided with functions of controlling the ejection flow rate of and regulating the flow of the irrigation liquid under high or low liquid pressure can be manufactured with less assembly error only with first member 4 and second member 5 made of a resin material. Therefore, drip irrigation dripper 1 is capable of stabilizing the ejection amount, and makes it possible to achieve cost reduction due to reduction in the manufacturing cost and the enhancement of the manufacturing efficiency as a result of the removal of a highly precise assembling step. In particular, drip irrigation dripper 1 according to the present embodiment is highly advantageous in terms of cost and manufacturing efficiency, compared with the case of incorporating a diaphragm made of an expensive material such as silicone rubber as a separate component.

In addition, each first valve segment 431*a* receives the liquid pressure from above, to thereby allow first valve element 431 of flow regulating valve part 43 to deflect downwardly and outwardly utilizing the elasticity of a resin material, in such a manner that the tips of the respective first valve segments 431*a* are spaced apart from each other. Thus, first valve segment 431*a* is formed into a suitable shape for expanding first slit 432 by receiving the liquid pressure efficiently, and therefore the inflow regulation can be performed more properly.

In addition, as for second valve element 531 of flow rate controlling valve part 53, each second valve segment 531a receives the liquid pressure of the irrigation liquid from the side opposite to ejection port 521 (from above, in FIGS. 17A and 17B), to thereby allow second valve element 531 to deflect toward ejection port 521 (downwardly, in FIGS. 17A and 17B) utilizing the elasticity of a resin material, in such a manner that the protrusion amount is decreased and that the tips of the respective second valve segments 531a are made to be closer to each other. Thus, second valve element 531 is formed into a suitable shape for narrowing opening width W2 of second slit 532 by receiving the liquid pressure efficiently, and therefore the flow rate toward ejection port 521 can be controlled more properly.

It is noted that the present invention is not limited to the above-described embodiments, and may be variously modified insofar as the features of the present invention are not impaired.

[Modification]

For example, first valve element 431 may have a shape other than the domed shape (e.g., pyramidal shape or flat shape) as necessary.

Figure 18:
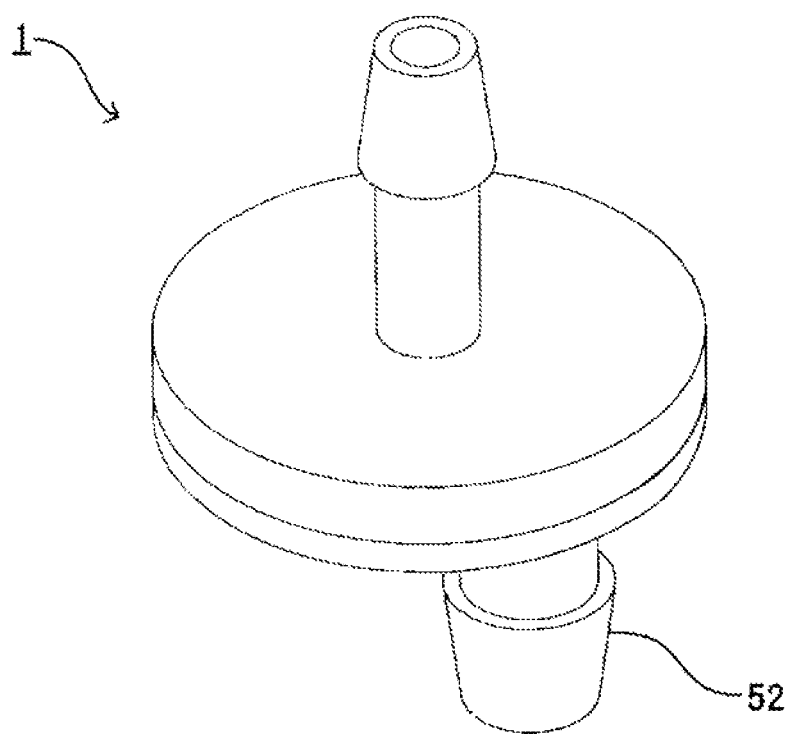
FIG. 18 is a perspective bird's-eye view illustrating a configuration of a drip irrigation device according to a first modification.

FIG. 18 is a perspective bird's-eye view illustrating the configuration of a drip irrigation device according to a first modification. As illustrated in FIG. 18, second tube part 52 may be formed shorter than that in the configuration of FIG. 1.

Figure 19:
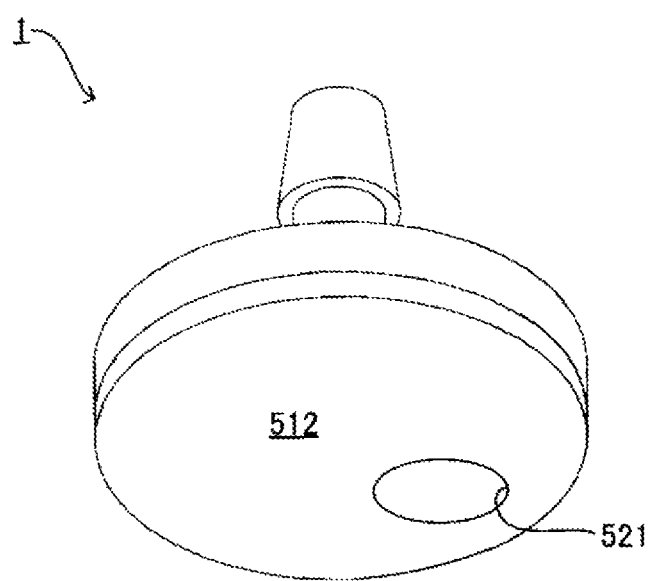
FIG. 19 is a perspective upward view illustrating a configuration of a drip irrigation device according to a second modification.

FIG. 19 is a perspective upward view illustrating the configuration of a drip irrigation device according to a second modification. As illustrated in FIG. 19, ejection port 521 may be formed on second outer surface 512 to thereby achieve the reduction in the amount of materials to be used.

Figure 20:
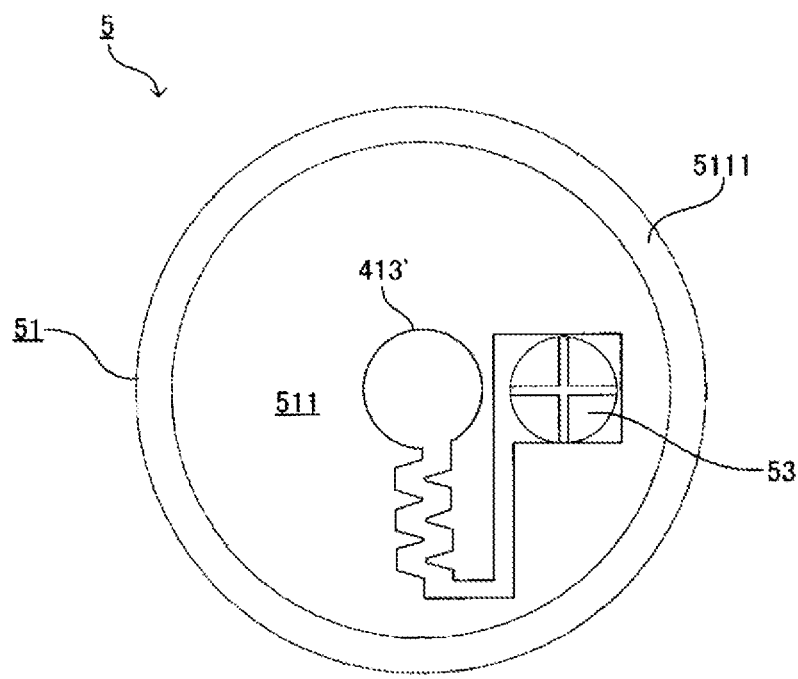
FIG. 20 is a plan view illustrating a configuration of a drip irrigation device according to a third modification.

FIG. 20 is a plan view illustrating the configuration of a drip irrigation device according to a third modification. Instead of forming inter-member channel part 413 on first inner surface 411 as illustrated in FIG. 13, similar component 413' may be provided on second inner surface 511 as illustrated in FIG. 20.

In addition, instead of providing the above-mentioned flow regulating valve part 43, a hydrophobic inflow part may be provided to thereby inhibit the inflow of the irrigation liquid having a liquid pressure of less than a lower limit.

Figure 21:
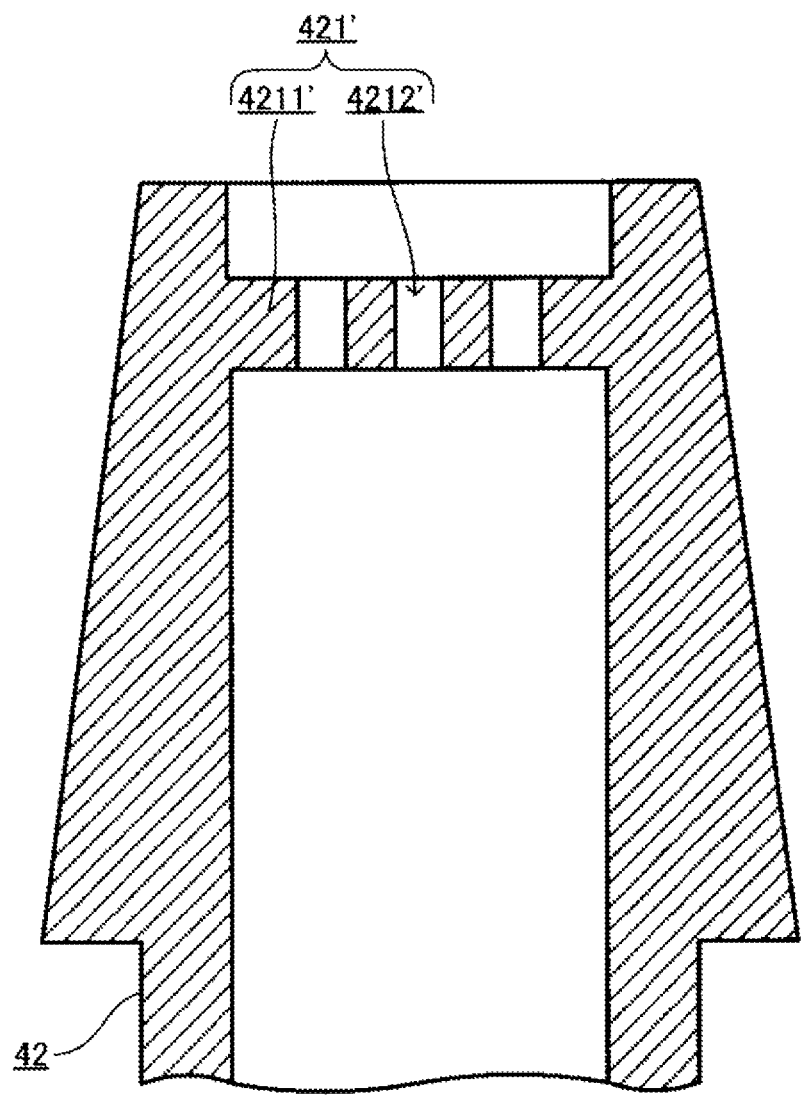
FIG. 21 is a schematic configuration diagram illustrating a configuration of a drip irrigation device according to a fourth modification.

FIG. 21 is a schematic configuration diagram illustrating the configuration of a drip irrigation device according to a fourth modification (enlarged sectional view of inflow part 421').

As illustrated in FIG. 21, inflow part 421' has substrate part 4211' orthogonal to the longitudinal direction of first tube part 42, and a plurality of circular pore-like inflow ports 4212' penetrating substrate part 4211' vertically (in other words, parallel to the longitudinal direction of first tube part 42).

Inflow part 421' is provided with a low-pressure stop filter function for not allowing irrigation liquid having a liquid pressure of less than a lower limit (e.g., 0.005 MPa) to flow into first tube part 42.

There are several possible means to embody the low-pressure stop filter function.

For example, when polypropylene is used as a material for drip irrigation dripper 1, the low-pressure stop filter function can be easily imparted to the entire surface of inflow part 421', since polypropylene itself is highly hydrophobic material with a low surface energy.

Other than that, when hydrophobic coating such as fluorine coating by means of a fluorine coating agent is applied to the top surface of substrate part 4211' and, as necessary, to the inner peripheral surface of inflow port 4212 to reduce the surface energy, the low-pressure stop filter function can be imparted to inflow part 221 locally without limiting the material for drip irrigation dripper 1.

In either case of depending on a material or applying a surface coating as described above, hydrophobicity may be reinforced by forming an irregular shape on the hydrophobic surface, as necessary.

This application is entitled to and claims the benefit of Japanese Patent Application No. 2012-274556 filed on Dec. 17, 2012, and Japanese Patent Application No. 2012-278354 filed on Dec. 20, 2012, the disclosure of which including the specification, drawings and abstract are incorporated herein by reference in their entirety.

REFERENCE SIGNS LIST

1 Drip irrigation dripper
2 Drip irrigation device
4 First member
41 First plate-like part
411 First inner surface
412 First outer surface
42 First tube part
421 Inflow port
5 Second member
51 Second plate-like part
511 Second inner surface
512 Second outer surface
521 Ejection port
53 Flow rate controlling valve part
7 Inter-member channel

The invention claimed is:

1. A drip irrigation dripper configured to perform drip irrigation by controlling an ejection amount when ejecting irrigation liquid flowing from an inflow part out of an ejection port, the drip irrigation dripper comprising:
a first member integrally formed of a resin material on the inflow part side; and
a second member integrally formed of a resin material on the ejection port side, the first member and the second member being brought into close contact with and fixed to each other,
wherein:
the first member includes:
a first plate-like part having a first inner surface brought into close contact with the second member and a first outer surface opposite to the first inner surface, and
a tube part being protruded from the first outer surface of the first plate-like part and having the inflow part being formed, the tube part configured to guide the irrigation liquid flowing from the inflow part to an inter-member channel, and
the second member includes:
a second plate-like part having a second inner surface brought into close contact with the first inner surface and a second outer surface opposite to the second inner surface, and
the ejection port,
the first member further includes a flow regulating valve part disposed to be exposed to the first inner surface side to block a downstream end inside the tube part, the flow regulating valve part configured to regulate a flow of the irrigation liquid guided by the tube part toward the ejection port at a lower limit of a liquid pressure of the irrigation liquid, or the inter-member channel being formed between the first member and the second member, the inter-member channel having surface shapes of close contact surfaces of both the members and being in communication with the inflow part and the ejection port, and the second member further includes a flow rate controlling valve part configured to control a flow rate of the irrigation liquid having reached a downstream end of the inter-member channel toward the ejection port.

2. The drip irrigation dripper according to claim 1, wherein:
the flow regulating valve part includes:
a plate-like first valve element to be exposed to a liquid pressure of the guided irrigation liquid, and
a first slit formed on the first valve element to allow the flow of the guided irrigation liquid,
the first slit being formed to have an opening width of zero when the first valve element is not exposed to the liquid pressure, and
the first valve element inhibiting the flow by maintaining the opening width of the first slit at zero without deformation of the first valve element when the liquid pressure is less than the lower limit, and the first valve element allowing the flow by expanding the first slit to have an opening width of more than zero through deformation of the first valve element when the liquid pressure is equal to or more than the lower limit.

3. The drip irrigation dripper according to claim 2, wherein the first slit is formed radially to thereby divide the first valve element into a plurality of first valve segments.

4. The drip irrigation dripper according to claim 2, wherein the first valve element is formed to have a shape protruded toward the second member.

5. The drip irrigation dripper according to claim 4, wherein:
the first valve element is formed such that a central portion of the first valve element is protruded the most, and
the first slit is formed radially around the central portion.

6. The drip irrigation dripper according to claim 5, wherein the first valve element is formed to have a dome shape.

7. The drip irrigation dripper according to claim 1, comprising an inter-member channel formed between the first member and the second member through a close contact between the first inner surface and the second inner surface to allow the irrigation liquid passing through the flow regulating valve part to flow toward the ejection port.

8. The drip irrigation dripper according to claim 7, wherein the inter-member channel has a pressure reduction channel configured to allow the irrigation liquid passing through the flow regulating valve part to flow while reducing a pressure of the irrigation liquid.

9. The drip irrigation dripper according to claim 8, wherein the second member includes a flow rate controlling valve part configured to control a flow rate of the irrigation liquid having reached a downstream end of the inter-member channel toward the ejection port.

10. The drip irrigation dripper according to claim 9, wherein:
the flow rate controlling valve part includes:
a plate-like second valve element to be exposed to a liquid pressure of the irrigation liquid having reached the plate-like second valve element, and
a second slit formed on the second valve element to allow the irrigation liquid having reached the second valve element to flow toward the ejection port,
the second slit being formed to have a predetermined opening width when the second valve element is not exposed to the liquid pressure, and
the second valve element configured to decrease the opening width of the second slit such that an amount of the decrease becomes larger relative to the predetermined opening width as the liquid pressure becomes larger through deformation of the second valve element depending on the liquid pressure.

11. The drip irrigation dripper according to claim 1, wherein:
the flow rate controlling valve part includes:
a plate-like second valve element to be exposed to a liquid pressure of the irrigation liquid having reached the plate-like second valve element, and
a second slit formed on the second valve element to allow the irrigation liquid having reached the second valve element to flow toward the ejection port,
the second slit being formed to have a predetermined opening width when the second valve element is not exposed to the liquid pressure, and
the second valve element configured to decrease the opening width of the second slit such that an amount of the decrease becomes larger relative to the predetermined opening width as the liquid pressure becomes larger through deformation of the second valve element depending on the liquid pressure.

12. The drip irrigation dripper according to claim 11, wherein:
the second valve element is formed to have a shape protruded toward a side opposite to the ejection port, and
the second slit is formed radially to thereby divide the second valve element into a plurality of second valve segments.

13. The drip irrigation dripper according to claim 12, wherein:
the second valve element is formed such that a central portion of the second valve element is protruded the most, and
the second slit is formed radially around the central portion.

14. The drip irrigation dripper according to claim 13, wherein the second valve element is formed to have a dome shape.

15. The drip irrigation dripper according to claim 1, wherein the inter-member channel has a pressure reduction channel configured to allow the irrigation liquid to flow while reducing a pressure of the irrigation liquid.

16. The drip irrigation dripper according to claim 1, wherein the first member includes a flow regulating valve part disposed to be exposed to the first inner surface side to block a downstream end inside the tube part, the flow regulating valve part configured to regulate a flow of the irrigation liquid guided by the tube part into the inter-member channel at a lower limit of a liquid pressure of the irrigation liquid.

17. The drip irrigation dripper according to claim 16, wherein:
the flow regulating valve part includes:
a plate-like first valve element to be exposed to a liquid pressure of the guided irrigation liquid, and
a first slit formed on the first valve element to allow the flow of the guided irrigation liquid,
the first slit being formed to have an opening width of zero when the first valve element is not exposed to the liquid pressure, and the first valve element inhibiting the flow by maintaining the opening width of the first slit at zero without deformation of the first valve element when the liquid pressure is less than the lower limit, and the first valve element allowing the flow by expanding the first slit to have an opening width of more than zero through deformation of the first valve element when the liquid pressure is equal to or more than the lower limit.

18. The drip irrigation dripper according to claim 1, wherein the inflow part is formed to have hydrophobicity to thereby inhibit an inflow of the irrigation liquid having a liquid pressure of less than the lower limit.

19. The drip irrigation dripper according to claim 1, wherein the inter-member channel is formed of a space interposed between a recessed surface disposed on one of the first inner surface or the second inner surface, and a planar surface or a recessed surface, facing the recessed surface, disposed on the other one of the first inner surface and the second inner surface.

20. A drip irrigation device comprising:
   the drip irrigation dripper according to claim 1, and
   an elongated flow tube through which the irrigation liquid flows,
   wherein
   the drip irrigation dripper is inserted into a tube wall or an opening of the flow tube through the tube part to thereby allow the irrigation liquid inside the flow tube to flow into a channel of the drip irrigation dripper from the inflow part.

* * * * *